United States Patent [19]

Hirzel

[11] Patent Number: 5,086,454
[45] Date of Patent: Feb. 4, 1992

[54] DIRECT CONNECT MODEM DERIVING POWER FROM TELEPHONE LINE

[75] Inventor: Frederic J. Hirzel, Cupertino, Calif.

[73] Assignee: Vocal Technologies, Ltd., Santa Clara, Calif.

[21] Appl. No.: 438,553

[22] Filed: Nov. 17, 1989

[51] Int. Cl.$^5$ ............................................. H04M 11/00
[52] U.S. Cl. ................................................. 379/98; 375/8
[58] Field of Search ........................... 379/98, 99, 100; 323/313; 307/296.6; 375/36, 8, 7; 340/310 A; 363/60, 61

[56] References Cited

U.S. PATENT DOCUMENTS

| | | | |
|---|---|---|---|
| 4,373,117 | 2/1983 | Pierce | 379/98 |
| 4,415,774 | 11/1983 | Driver | 379/98 |
| 4,417,099 | 11/1983 | Pierce | 379/98 |
| 4,578,533 | 3/1986 | Pierce | 379/98 |
| 4,656,318 | 4/1987 | Noyes | 379/98 |
| 4,691,344 | 9/1987 | Brown et al. | 379/106 |
| 4,777,577 | 10/1988 | Bingham et al. | 363/60 |
| 4,797,899 | 1/1989 | Fuller et al. | 363/60 |
| 4,803,719 | 2/1989 | Ulrich | 379/93 |

Primary Examiner—James L. Dwyer
Assistant Examiner—Ahmad F. Matar
Attorney, Agent, or Firm—Townsend & Townsend

[57] ABSTRACT

A telephone modem which is at least partially powered by electrical power from a telephone line to which it is connected and which is further powered by a local power source, such as power extracted from digital serial data lines to which it is coupled or from a battery source or a combination thereof. Telephone line power is used to operate all analog signal processing, and local power is used to operate the remainder of the modem, including digital signal transmission, reception and manipulation, as well as modem control functions. In a preferred embodiment, optical isolation means provide isolation between differently-powered segments of the modem circuitry. The analog signal processing segment is coupled to the telephone line in a manner which maintains line current requirements and constant a.c. impedance, and regulated power is derived from the intermittent telephone line power source. In a further specific embodiment, charge pump circuitry is employed to extract both positive and negative inverted power from the digital serial data signal line for use as local power.

2 Claims, 4 Drawing Sheets

DIRECT CONNECT MODEM DERIVING POWER FROM TELEPHONE LINE

BACKGROUND OF THE INVENTION

This invention relates to a modem power supply, and more particularly to a telephone line modem which is directly coupled to a telephone network and which is at least partially powered by power which is supplied by the telephone network.

A telephone line modem is used to provide signal connections between an analog telephone line and for example a digital computer system. Electrical energy is required to power the modem. In the past, power has been provided by a local power source, such as a battery or a power supply coupled to the a.c. power mains. Since the power mains has been considered an adequate and reliable source of power, and since the power available on the telephone lines has been considered intermittent or insufficient and thus unreliable, it has been preferred to use reliable local power in connection with the functions of a modem.

Virtually all telephone sets have employed power from the telephone line to power the electronic circuitry as a matter of necessity and where local power is not indicated or available.

Local power is considered preferred. Attempts have been made to power modems from terminal or serial line power. Sources include Novation, for its Parrot modem, Black Box for its Tote-a-Modem, Migent and Teamworks. All of these approaches suffer one significant deficiency: power must be supplied to the analog portion of the modem from a local power source. Hence precious power is wasted. Battery powered-terminals in particular tend to run out of power quickly.

Circuitry is known for optical isolation, and charge pump circuitry is known for power inverter applications. Use in a telephone line modem in connection with a power supply has not been known.

There is a need to provide a low-power drain modem which requires no external power supplies.

SUMMARY OF THE INVENTION

According to the invention, a telephone modem is provided which is at least partially powered by electrical power from a telephone line to which it is connected and which is further powered by a local power source, such as power extracted from digital serial data lines to which it is coupled or from a battery source or a combination thereof. Telephone line power is used to operate all analog signal processing, and local power is used to operate the remainder of the modem, including digital signal transmission, reception and manipulation, as well as modem control functions. In a preferred embodiment, optical isolation means provide isolation between differently-powered segments of the modem circuitry. The analog signal processing segment is coupled to the telephone line in a manner which maintains line current requirements and constant a.c. impedance, and regulated power is derived from the intermittent telephone line power source. In a further specific embodiment, charge pump circuitry is employed to extract both positive and negative inverted power from the digital serial data signal line for use as local power.

The invention will be better understood by reference to the following detailed description in connection with the accompanying drawings.

DESCRIPTION OF SPECIFIC EMBODIMENTS

Figure 1:
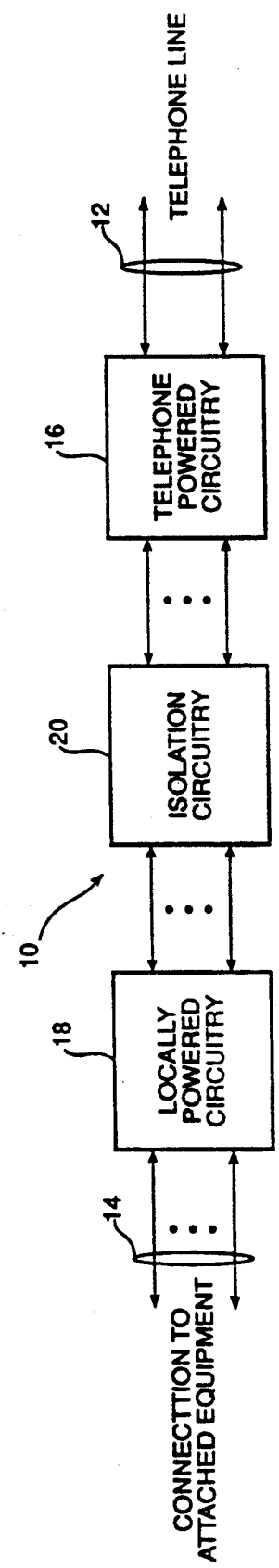
FIG. 1 is a block diagram of a dual power supply modem according to the invention.
Figure 2:
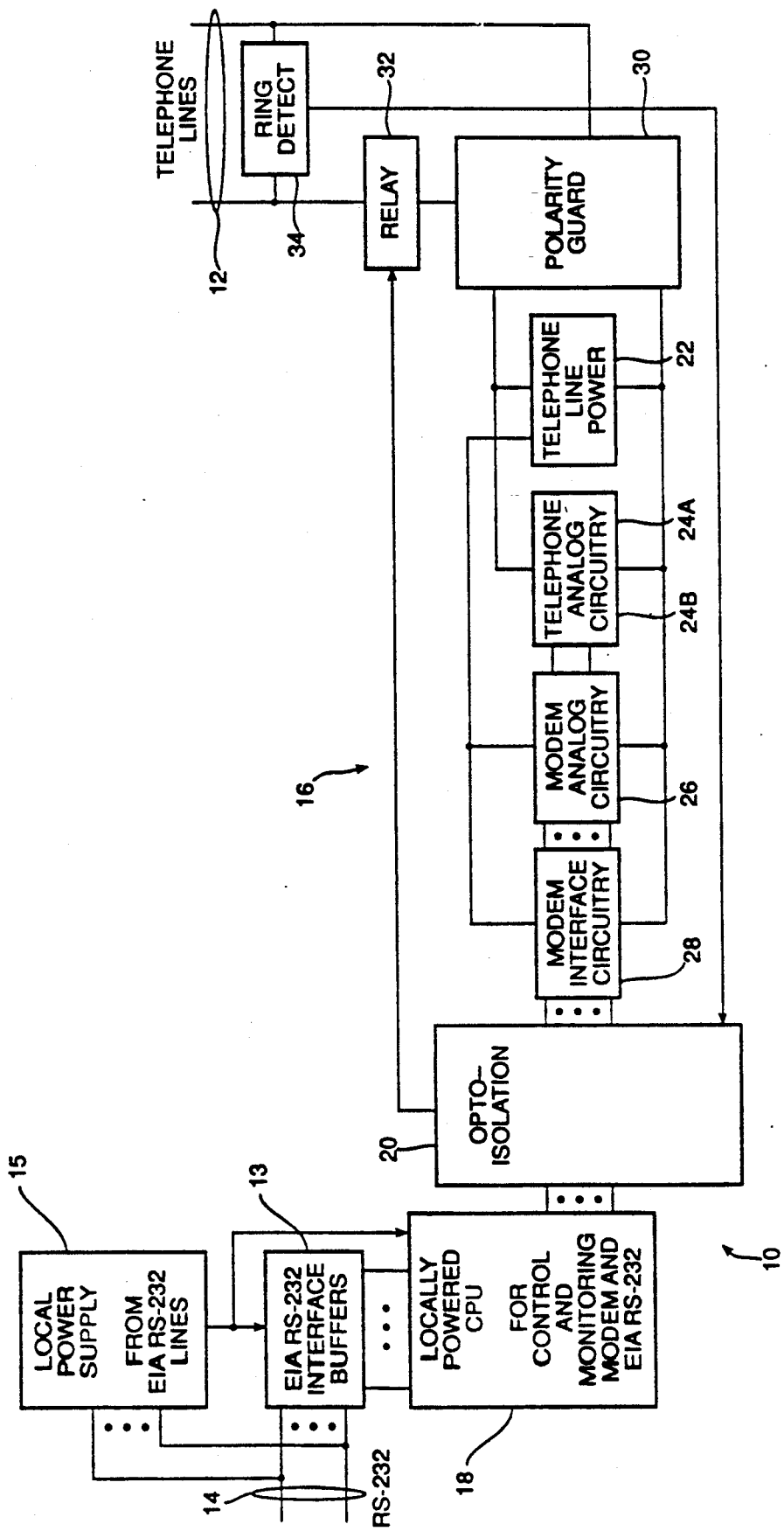
FIG. 2 is a detailed block diagram of a dual power supply modem according to the invention.

FIG. 1 is a simple block diagram of a modem 10 in accordance with the invention showing the fact that there are no external power connections except through the telephone line 12 and through connections 14 by way of standard EIA RS-232C interface buffers 13 (FIG. 2) to the local equipment (not shown), such as for example a serial interconnect of a computer terminal. FIG. 2 illustrates a further detailed block diagram of the modem 10.

The invention comprises a modem 10 including a first circuit portion 16 powered by power from a telephone line power source during electrical connection to a telephone line 12, the first circuit portion including all analog signal handling circuitry of the telephone modem 10 as hereinafter explained, a second circuit portion 18 powered by a local power source 15, which may include power derived from the interface signals or a battery circuit, and isolation means 20 coupled between the first circuit portion 16 and the second circuit portion 18 for the isolating telephone line 12 power source and the local power source 15.

Figure 3:
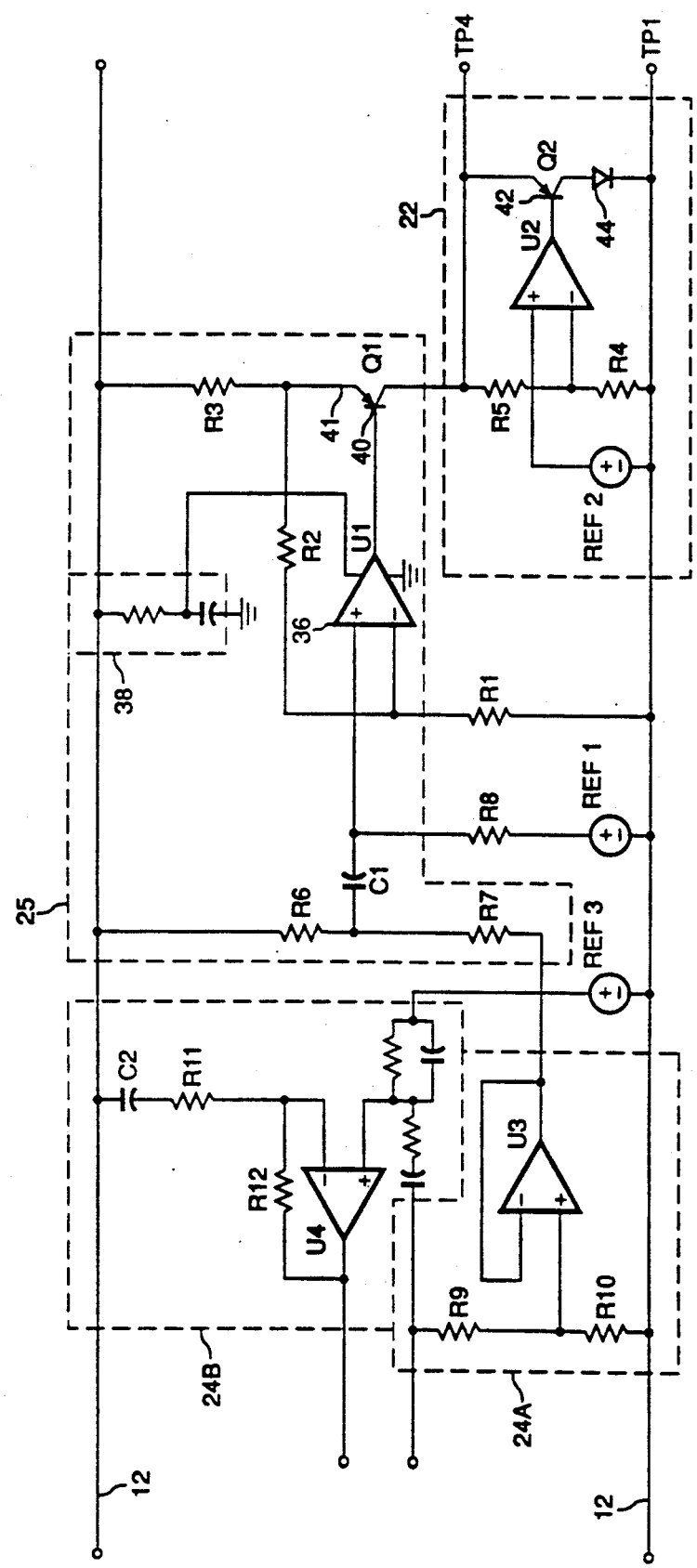
FIG. 3 is a schematic diagram of a portion of a telephone line interface in accordance with the invention.

Referring to FIGS. 2 and 3, the telephone line power source on telephone line 12 comprises d.c.-biased power supplied by the telephone company and which is subject to drop-out. The first circuit portion 16 includes power regulator 22 for d.c.-powered circuit elements (26, 28) for extracting d.c. power from the telephone line 12, means 24A coupled to the telephone line 12 for transmitting analog signals to telephone line 12, and means 24B coupled to the telephone line 12 for receiving signals from the telephone line 12 as analog telephone signals. The first circuit portion 16 may further include modem analog circuitry 26, such as a conventional single chip modem, and modem interface circuitry 28, such as random logic for coupling to the isolation means 20.

The first circuit portion 16 may further include a polarity guard 30 to assure against inadvertent application of reverse polarity power to the first circuit portion 16, a relay 32 for signalling or creating an off-hook condition, and a ring detector 34 across the telephone line 12 to signal the receipt of a ring on the line 12 to the control circuitry through the isolation means 20.

The isolation means 20 may be a variety of power/ground separation means. In the preferred embodiment, the isolation means comprises opto-isolators for isolating power supplies while passing ring detect (monitor) signals, data signals and control signals.

Referring to FIG. 3, the first circuit portion 16 combines circuitry in a manner which overcomes specific difficulties. Means 25 are provided for matching a.c. line characteristics of the telephone line 12 and d.c. line characteristics of the telephone line 12 through a single active element 36. The single active element 36 is an operational amplifier such as a Texas Instruments TLC27L4 low powered device in a quad package, which is powered through a low pass filter 38 across the telephone line 12. When there is power drop out, there is no power to operate the active element, which is an acceptable condition.

The single active element 36 may have internal dominant pole compensation such that the operational amplifier is subject to frequency instabilities when used with certain types of output stages. An output stage is provided including a base-driven PNP transistor 40 in emitter follower configuration with the emitter 41 in the negative feedback loop of the active element 36. The power of the telephone line 12 is routed through the transistor 40 and made available as a substantially stable power source to, for example, the telephone line power regulator 22. The power regulator 22 also includes an emitter follower-coupled transistor 42 as a shunt element in a shunt regulator and in addition an LED 44 as a power limiter to limit the power dissipated by the transistor 42.

Figure 4:
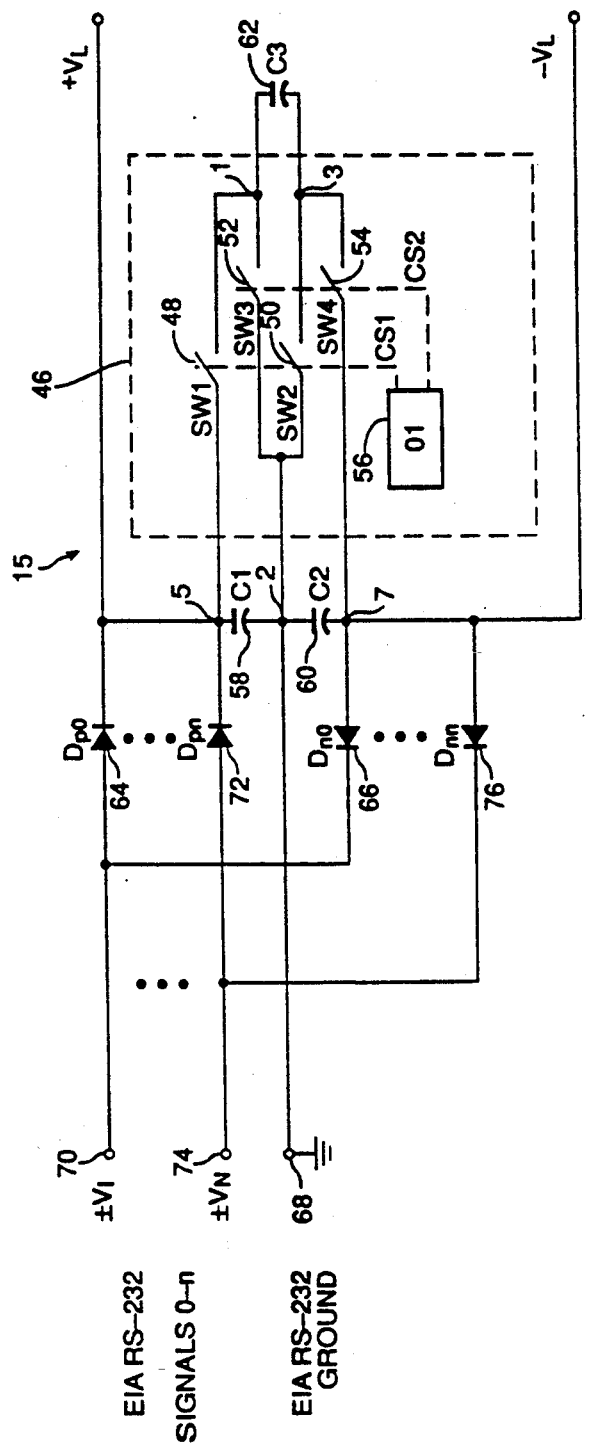
FIG. 4 is a schematic diagram of a positive/negative inverter circuit according to the invention.

Referring to FIG. 4, there is shown a portion of a local power supply 15 in accordance with the invention for extracting d.c. power from signals of, for example, EIA RS-232C signal lines. (Regulators and the like are not shown.) The circuit is built upon the premise that a bi-directional charge pump circuit can be constructed to operate through a monolithic voltage inverter 46, specifically a monolithic CMOS charge pump voltage inverter chip, such as a Maxim ICL7660, (from Maxim Integrated Products, Inc., of Sunnyvale, Calif.) by routing current through the switches of the inverter bi-directionally. (The application of bi-directional currents through the chip was not contemplated by the circuit designers.) The inverter 46 can be used to implement simultaneously both positive inverter functions and negative inverter functions to derive power from data signals. The circuit has numerous advantages: if only one voltage level is available, the other voltage level is generated automatically; for whatever voltage levels are generated, the available output voltage is virtually twice as much; and there is a charge balancing between positive and negative voltages so that maximum power is extracted from the data lines without respect to the polarities of the data lines.

FIG. 4 illustrates a circuit which provides these features. The CMOS inverter 46 comprises a first bi-directional switch 48, which is a CMOS switch, a second bi-directional switch 50, a third bidirectional switch 52, a fourth bi-directional switch 54, a switch controller 56, such as a free-running oscillator, for switching the first switch 48 and the second switch 50 in synchronism and for switching the third switch 52 and the fourth switch 54 in synchronism and in non-overlapping closed states with the first switch 48 and second switch 50. In other words, the switch pairs are alternately on and off and never overlap in their closed states. The first switch 48 has a first node 1 in common with the third switch 52, the second switch 50 has a second node 2 in common with the third switch 52, and the fourth switch 54 has a third node 3 in common with the second switch, the first switch 48 has a fifth node 5 and the fourth switch 54 has a seventh node 7.

Using the above inverter 46, the apparatus according to the invention comprises a first capacitor 58, a second capacitor 60, and a third capacitor 62; a first diode 64 and a second diode 66. In this circuit, the second node 2 is coupled to a first terminal of the first capacitor 58 and to a first terminal of the second capacitor 60 at a common ground reference 68; the third capacitor 62 is coupled between the first node 1 and the third node 3; the first diode 64 is coupled from a first voltage source 70 to a second terminal of the first capacitor 58 at the fifth node 5 and is disposed to pass current when forward biased by the first voltage source 70; and the second diode 66 is coupled from the first voltage source 70 to a second terminal of the second capacitor 60 at the seventh node 7 and which is disposed 1) to block current when the first diode 64 is forward biased by the first voltage source 70 and 2) to pass current when the first diode 64 is reverse biased.

In operation, when the first diode 64 is forward biased by a positive voltage source 70, the source 70 contributes charge and power to the first capacitor 58. When the second diode 66 is forward biased by a negative voltage source 70, source 70 contributes charge and power to the second capacitor 60. The circuit 46 serves to render the voltage on the first capacitor 58 equal to the voltage on the second capacitor 60 and the voltage on the second capacitor 60 equal to the voltage on the first capacitor 58 by bi-directional flow of current through the commutation switches 48, 50, 52, 54. Specifically, circuit 46, through the complimentary operation of the commutation switches 48, 50; and 52, 54 in cooperation with the third capacitor 62 forces the voltages on the first capacitor 58 and second capacitor 60 to be equal.

Any number of data signal lines may be tapped to extract power from the data signal lines. In order to do so, additional diode pairs may be added. For example, the apparatus according to the invention further includes a third diode 72 coupled from a second voltage source 74 to the fifth node 5 and a fourth diode 76 coupled from the second voltage source 74 to the seventh node 7 in reverse polarity relationship to the third diode 72. Power is thus contributed in the form of charge to the capacitors 58 and 60 from whatever voltage source which has the greatest voltage, regardless of polarity.

The invention has now been explained with reference to specific embodiments. Other embodiments will be apparent to those of ordinary skill in the art. It is therefore not intended that the invention be limited except as indicated by the appended claims.

I claim:

1. An apparatus to generate negative and positive voltages from either negative voltages, positive voltages or a combination of positive and negative voltages using a CMOS voltage inverter which comprises:

a first bi-directional switch;
a second bi-directional switch;
a third bi-directional switch;
a fourth bi-directional switch;
a switch controller for switching said first switch and said second switch in synchronism and for switching said third switch and said fourth switch in synchronism and in non-overlapping closed states with said first switch and said second switch;
said first switch having a first node in common with said third switch, said second switch having a second node in common with said third switch, and said fourth switch having a third node in common with said second switch, said first switch having a fifth node and said fourth switch having a seventh node, the apparatus comprising:

a first capacitor;
a second capacitor;
a third capacitor;
a first diode;

a second diode; and wherein said second node is coupled to a first terminal of said first capacitor and to a first terminal of said second capacitor at a common ground reference;

wherein said third capacitor is coupled between said first node and said third node;

wherein said first diode is coupled from a first voltage source to a second terminal of said first capacitor and to said fifth node and which is disposed to pass current when forward biased by said first voltage source; and wherein said second diode is coupled from said first voltage source to a second terminal of said second capacitor and to said seventh node and which is disposed to block current when the said first diode is forward biased by said first voltage source and to pass current when said first diode is reverse biased in order to charge said first capacitor and said second capacitor from positive voltage, from negative voltage or from both positive and negative voltage upon alternate switching by said switch control means to cause current to flow in either direction through said switches.

2. The apparatus according to claim 1 further including a third diode coupled from a second voltage source to said fifth node and a fourth diode coupled from said second voltage source to said seventh node.

* * * * *